(12) United States Patent
Eyada (10) Patent No.: US 9,565,115 B2
(45) Date of Patent: Feb. 7, 2017

(54) VIRTUAL MACHINE TRAFFIC ENGINEERING

(71) Applicant: Brocade Communications Systems, Inc., San Jose, CA (US)

(72) Inventor: Hatem Eyada, Elk Grove, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 44 days.

(21) Appl. No.: 14/460,948

(22) Filed: Aug. 15, 2014

(65) Prior Publication Data

US 2015/0055474 A1   Feb. 26, 2015

Related U.S. Application Data

(60) Provisional application No. 61/867,667, filed on Aug. 20, 2013.

(51) Int. Cl.
| | | |
|---|---|---|
| H04L 12/24 | (2006.01) | |
| H04L 12/803 | (2013.01) | |
| G06F 9/455 | (2006.01) | |
| H04L 29/08 | (2006.01) | |
| G06F 9/50 | (2006.01) | |
| G06F 11/30 | (2006.01) | |
| G06F 11/34 | (2006.01) | |
| H04L 29/12 | (2006.01) | |

(52) U.S. Cl.
CPC ......... *H04L 47/125* (2013.01); *G06F 9/45533* (2013.01); *G06F 9/45558* (2013.01); *G06F 9/50* (2013.01); *G06F 11/3006* (2013.01); *G06F 11/3433* (2013.01); *H04L 67/1004* (2013.01); *G06F 2009/45595* (2013.01); *H04L 61/6022* (2013.01)

(58) Field of Classification Search
CPC .... G06F 9/50; G06F 9/45533; G06F 9/45558; G06F 11/30; G06F 2009/45595; H04L 47/125; H04L 61/6022; H04L 67/101; H04L 67/1004; H04L 67/1021; H04W 24/08; H04W 12/08
See application file for complete search history.

(56) References Cited

U.S. PATENT DOCUMENTS

| | | | | |
|---|---|---|---|---|
| 2009/0150564 A1* | 6/2009 | Anbalagan | ............... | H04L 47/10 709/241 |
| 2010/0027420 A1* | 2/2010 | Smith | ................... | G06F 9/4856 370/235 |
| 2013/0326515 A1* | 12/2013 | Hara | ........................ | G06F 9/455 718/1 |

* cited by examiner

*Primary Examiner* — Fan Ng
(74) *Attorney, Agent, or Firm* — Blank Rome, LLP (57) ABSTRACT

A mechanism to allow switch manager software to determine bandwidth consumption and cooperate with a VM manager. Counter hardware measures network traffic between the various ports of the switch stack. The switch manager determines the MAC or IP addresses of devices connected to each port, which are provided to the VM manager to correlate VMs to ports. The switch manger collects statistics from the counter hardware to determine traffic flow levels between the various ports. A list of high traffic port pairs is provided to the VM manager. In conjunction with each port is a list of available ports, identified by at least one MAC or IP address associated with that port, having capacity to receive the traffic of the respective ports of each port pair and provided in order of least to most hops, to allow the VM manager to select a closer port to receive a migrated VM.

20 Claims, 10 Drawing Sheets

VIRTUAL MACHINE TRAFFIC ENGINEERING

CROSS REFERENCE TO RELATED APPLICATIONS

This application claims the benefit under 35 U.S.C. §119 (e) of U.S. Provisional Patent Application Ser. No. 61/867,667 entitled "Virtual Machine Traffic Engineering," filed Aug. 20, 2013, which is hereby incorporated by reference.

BACKGROUND OF THE INVENTION

1. Field of the Invention

The invention relates to network devices and computers executing virtual machines.

2. Description of the Related Art

A revolution is well underway in the data center, namely the conversion from single purpose servers to servers executing a series of virtual machines (VMs), each virtual machine then acting as the previous single purpose server. This virtual machine model allows much better use of the server hardware resources than the prior single use model. The virtual machines are managed using a virtual machine manager. The virtual machine manager can monitor the loading of each physical server and migrate virtual machines between physical servers to address overload conditions. While this may be very helpful when managing the physical server hardware, no consideration is made regarding the underlying physical network infrastructure. VMs are migrated only based on server hardware loading and not network constraints. As a result, it is not unusual to end up with excessive bandwidth consumption and traffic high latency within an L2/L3 router-switch stack, or router-switch virtual chassis cluster, due to high volume transit traffic between physical servers that are connected to different devices within the stack or cluster. As a result, the performance of the VMs may actually be degraded, as compared to the original configuration and definitely is suboptimal.

SUMMARY OF THE INVENTION

Embodiments according to the present invention provide a mechanism to allow switch manager software to determine bandwidth consumption by particular VMs and cooperate with the VM manager to include network characteristics into the VM migration process. In a preferred embodiment counter hardware is provided in each switch port to measure network traffic between the various ports of the switch stack or switch cluster. The switch manager also monitors switch traffic to determine the media access control (MAC) or Internet Protocol (IP) addresses of devices connected to each port. This MAC or IP address to port list is provided to the VM manager, which can correlate specific VMs to specific ports. Periodically the switch manger collects statistics from the counter hardware to determine traffic flow levels between the various ports. A list of high traffic port pairs is provided to the VM manager. Provided in conjunction with each port pair is a list of available ports, identified by at least one MAC or IP address associated with that port, having sufficient capacity to receive the traffic of the respective ports of each port pair. Preferably this available port list is provided in order of least hops to most hops, to allow the VM manager to select the closest port, or at a least a closer port, when evaluating possible server hardware to receive a migrated VM. Thus the VM manager can use both server hardware capacity and network configuration and capacity in determining where to move a VM.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1A:
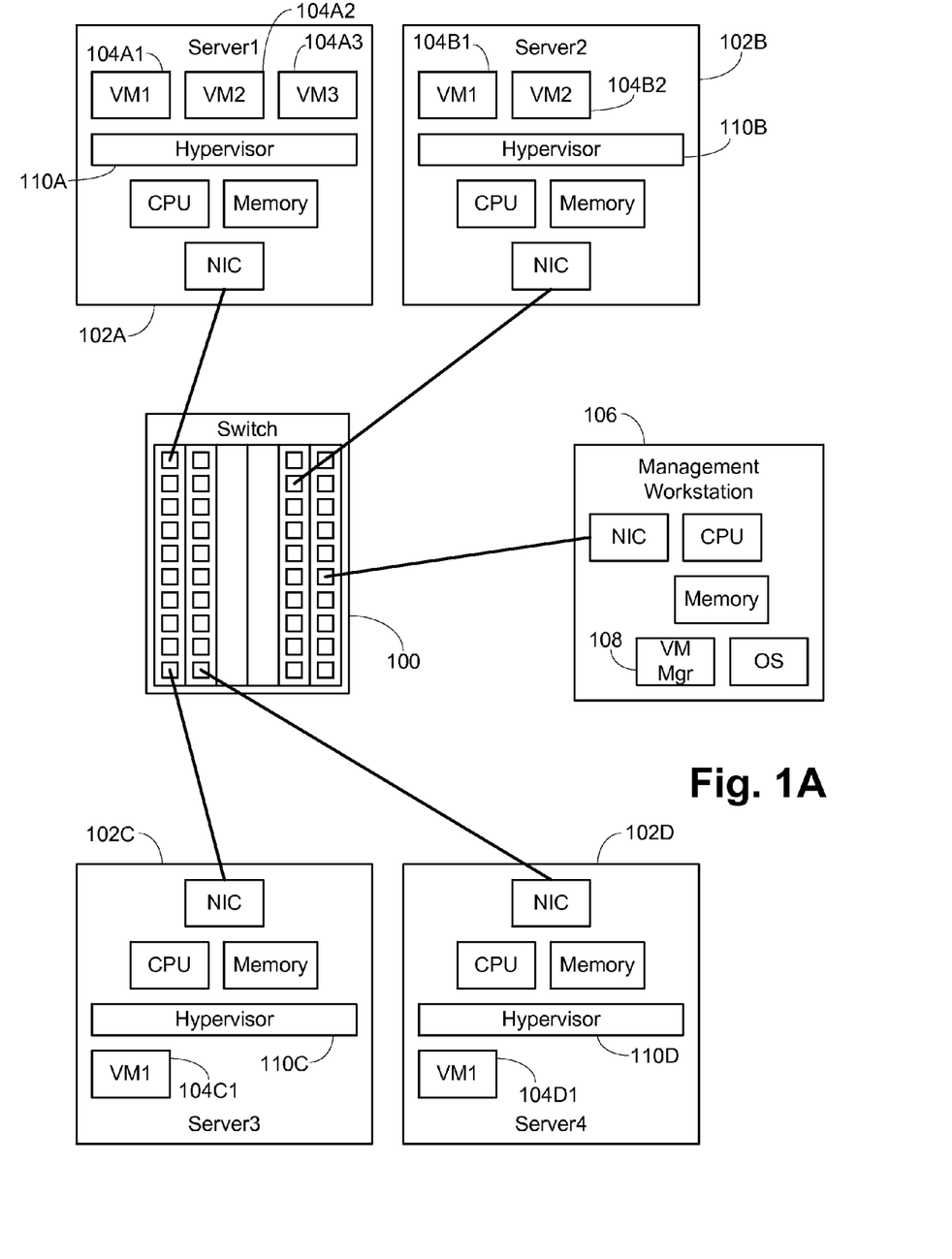
FIG. 1A is a block diagram of a network including a plurality of servers incorporating virtual machines, a management workstation and a large chassis Ethernet switch according to the present invention.

FIG. 1A illustrates a simplified, typical data center using a large modular chassis Ethernet switch mo. An exemplary block diagram of the large chassis Ethernet switch 100 is provided in FIG. 2B, where two blades 202, 204, each having four ports 206A-H and their related packet processors 208A-H, and one central processor/switch core blade 210 are shown. Four servers servers-server4 102A-D are connected to different ports on the large chassis Ethernet switch 100. Each server 102 has a least one VM 104 executing on the server physical hardware. For example, switch1 102A has three VMs 104A1-104A3, switch 2 has two VMs 104B1, 104B2 and the other switches each have one VM 104C1, 104D1. A management workstation 106 containing a VM manager 108 is also connected to the switch 100 to allow the VM manager 108 to access the hypervisors no in each server 102 and thus control the VMs 104. Example virtual machine environments include VMWare, Hyper-V and Xen.

Figure 1B:
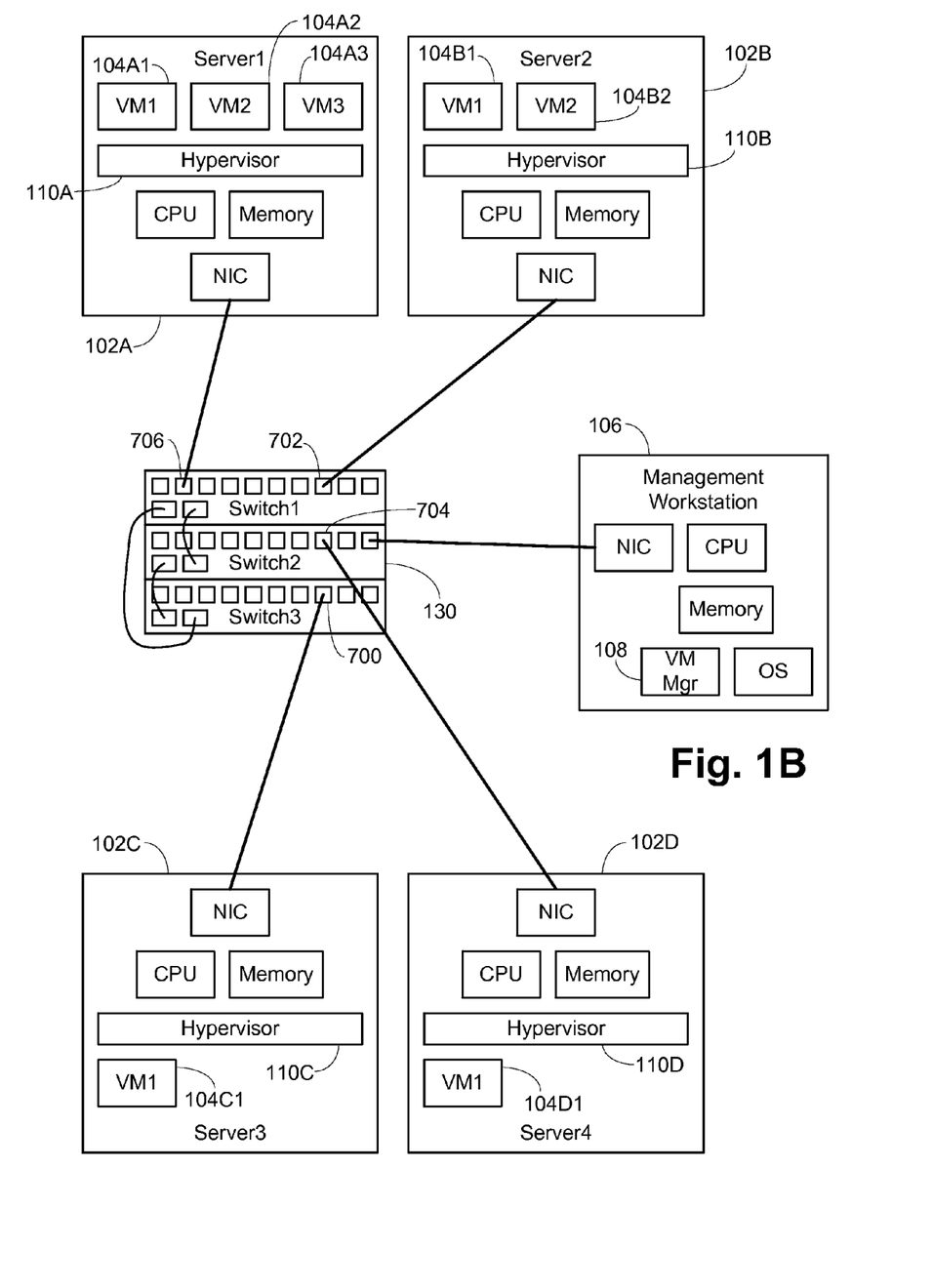
FIG. 1B is a block diagram of a network including a plurality of servers incorporating virtual machines, a management workstation and a stackable Ethernet switch according to the present invention.
Figure 2A:
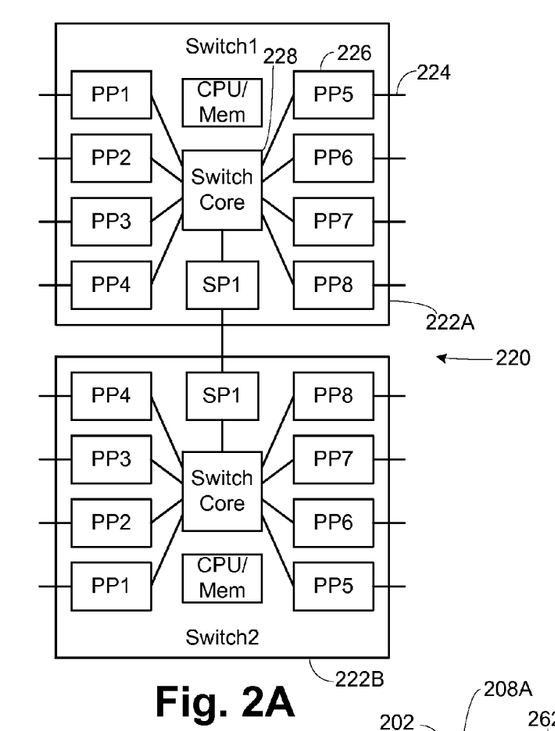
FIG. 2A is a block diagram of the stackable Ethernet switch of FIG. 1B.

FIG. 1B is an alternate arrangement of the network of FIG. 1A where the large chassis Ethernet switch 100 has been replaced by an Ethernet switch-stack 130. FIG. 2A illustrates an exemplary block diagram of two switches 222A, B in a switch-stack configuration 220, each switch 222A, 222B having a plurality of ports 224 and associated packet processors 226 connected to a switch core 228, with a stack port 230 interconnecting the two switches 220A, 220B.

Figure 1C:
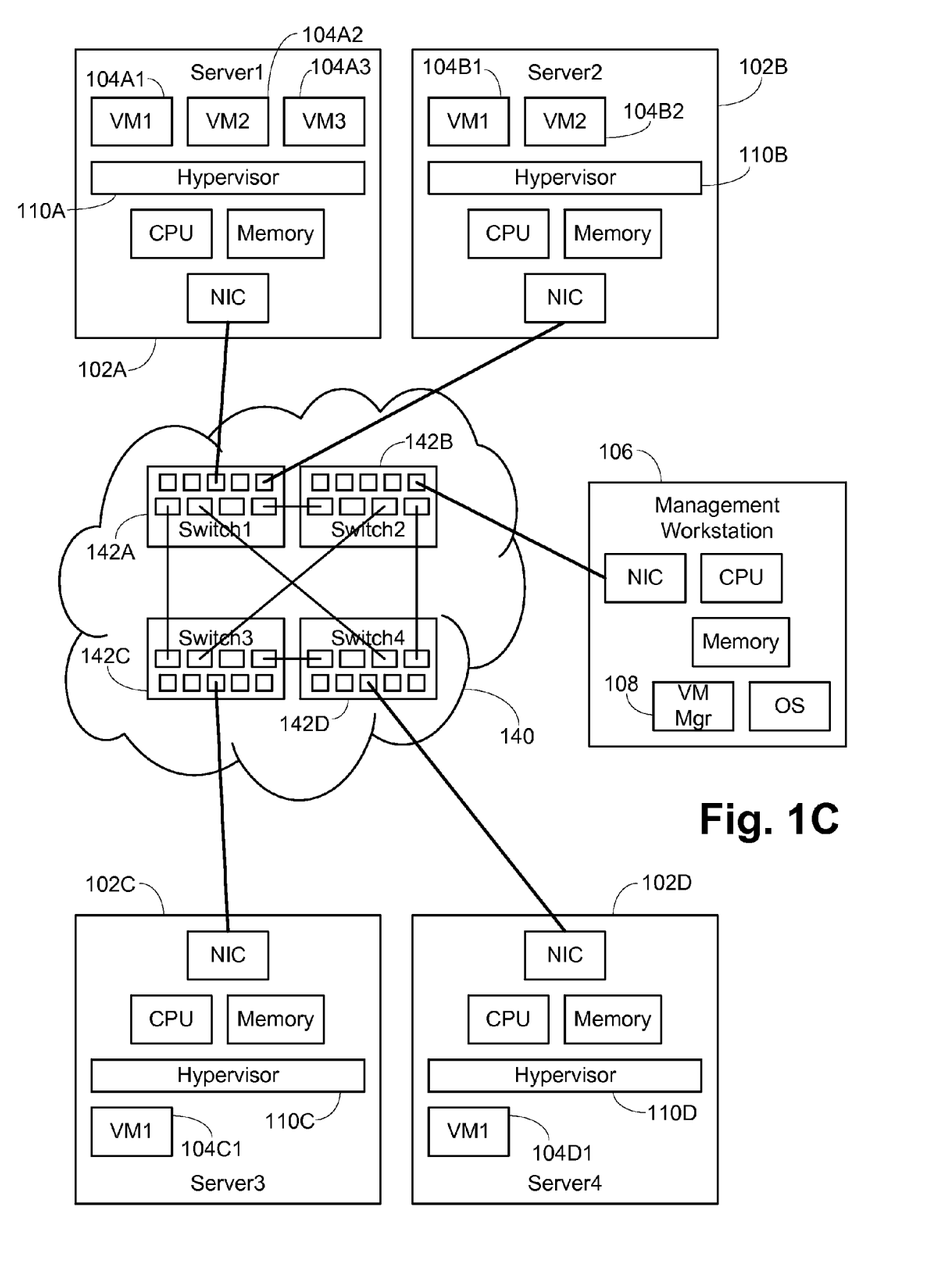
FIG. 1C is a block diagram of a network including a plurality of servers incorporating virtual machines, a management workstation and an Ethernet fabric according to the present invention.
Figure 1D:
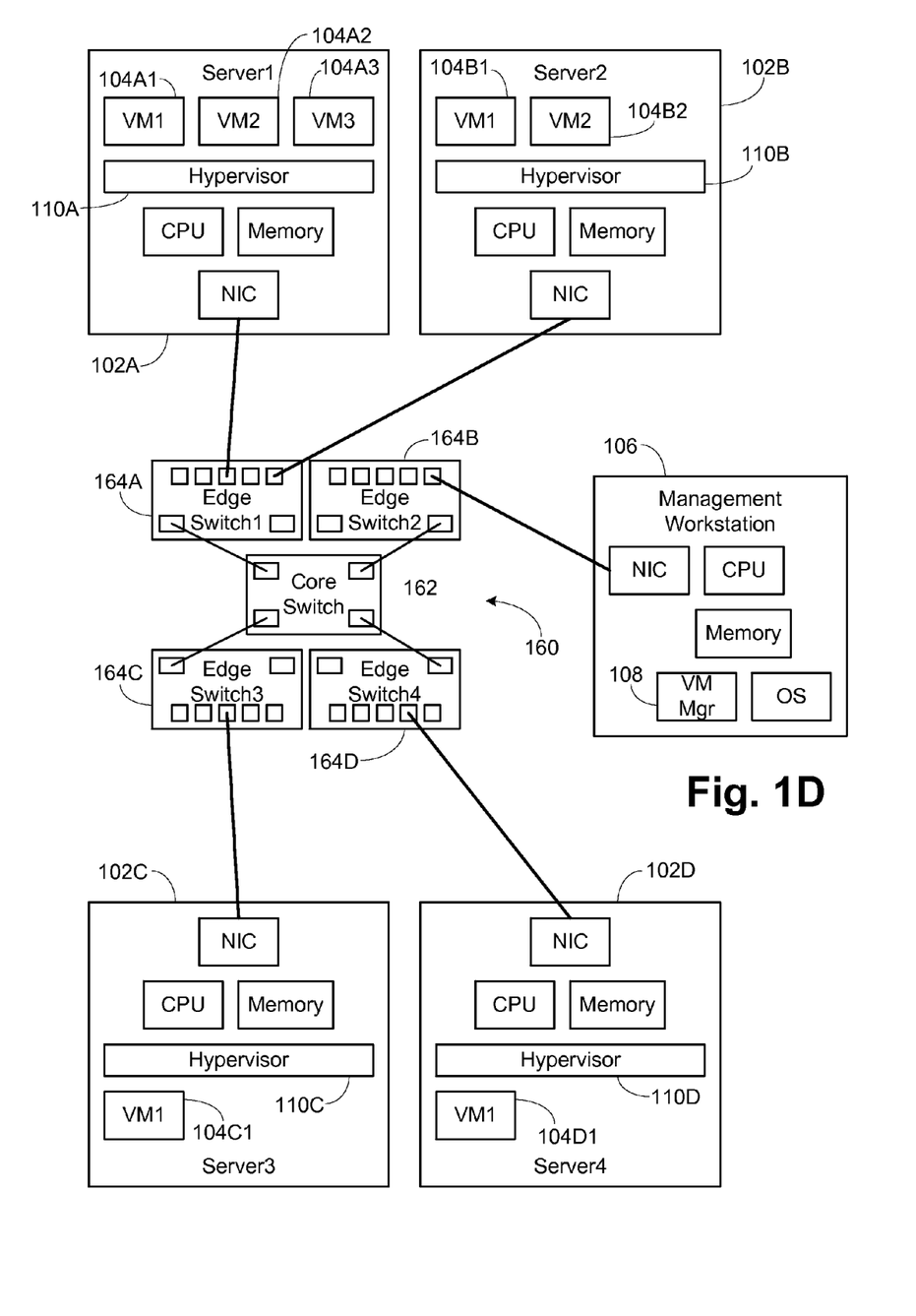
FIG. 1D is a block diagram of a network including a plurality of servers incorporating virtual machines, a management workstation and an edge-core Ethernet switch configuration according to the present invention.

FIG. 1C is another alternate arrangement where the switching is done using a switch cluster 140, such as the VDX series of Ethernet switches 142A-D from Brocade Communications, Inc. FIG. 1D is a more conventional core-edge switch configuration 160 with a core switch 162 and edge switches 164A-D as used in the network of FIG. 1A. The Ethernet switches 142, core switch 162 and edge switches 164A-D have block diagrams similar to the switches 202 except they do not contain a stack port.

Using a layer 2/layer 3 (L2/L3) fixed chassis router-switch stack 130 within a data center can provide lower latency and cost than large modular chassis switch 100 if the stack-transit traffic is optimized. On average the port-to-port packet latency within a fixed chassis router-switch is significantly less than its counterpart within a modular chassis. The same possibility applies to a router-switch virtual chassis cluster where inter-chassis transit traffic can be optimized.

Stack-transit, or cluster-transit, traffic reduces the overall stack/virtual-chassis bandwidth given that a single flow passes across multiple devices. Also, the total per packet latency equals the per device port-to-port latency multiplied by the number of devices it crosses from the source to the destination. If the stack-transit traffic is eliminated, or reduced, then the performance of a single stack-member will be better than a modular-chassis.

Figure 3:
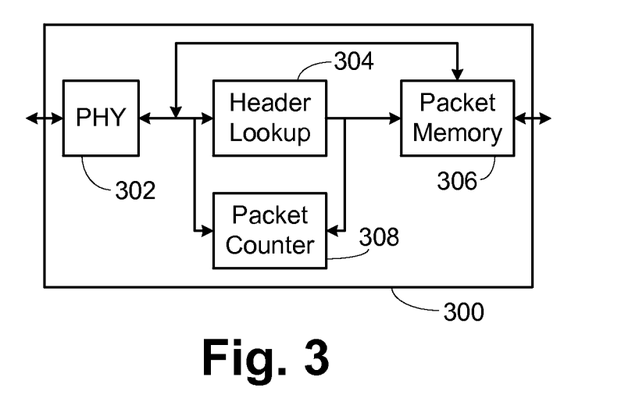
FIG. 3 is a block diagram of a port packet processor according to the present invention.

FIG. 3 illustrates a very simple block diagram of a packet processor 300 as associated with each port of the Ethernet switches discussed above. Each port processor 300 includes a PHY 302, a header lookup block 304, packet memory 306 and a packet counter 308 according to the present invention. The packet counter 308 is provided in more detail in FIG. 4. A dual ported table memory 400 receives the ingress port data and egress port data as address bits, allowing simple access to the desired table location. Each table location includes as data a packet count and a traffic length value. On each access the packet count is incremented using an incrementer 402 and the length of the current packet is added to the stored value using an adder 404. Preferably the increment and addition are done using a read-modify-write operation for speed.

Figure 4:
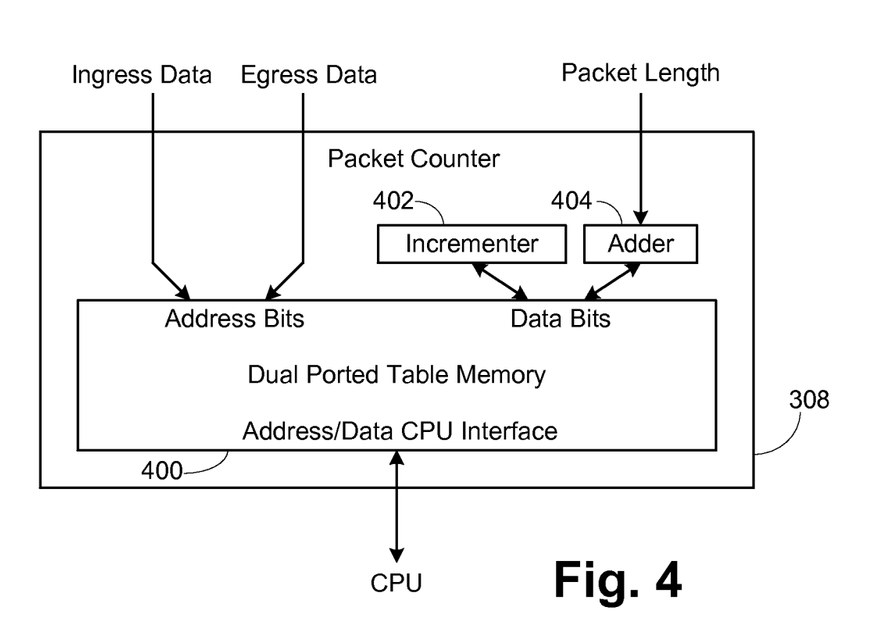
FIG. 4 is a block diagram of the packet counter of FIG. 3.

It is understood that the packet processor 300 of FIG. 3 and the packet counter 308 of FIG. 4 are highly simplified for purposes of illustration and many variations are commonly used.

In the preferred embodiment the ingress port data and the egress port data are unique identifiers. For example, in a switch stack 130, virtual chassis cluster 140 or core-edge configuration 160 the values can be the packet originator ingress device ID, ingress module ID, ingress port index, egress device ID, egress module ID, and egress port index when local forwarding is done. These values are provided from the needed L2/L3/ACL/etc. . . . forwarding lookup performed by a header lookup block used in the packet processor to properly route the packet. In certain arrangements there is a remote forwarding decision. In cases such as distributed routing, the local switch is acting as L2 device only and the forwarding lookup is done at another member of the stack. In those cases the ingress device ID, ingress module ID and ingress port index are appended to the packet and the remote stack-member extracts the originator ingress device ID, module ID and port and performs the normal header lookup for routing. This then allows the remote stack member to operate as described above and do the packet count and length storage.

Figure 2B:
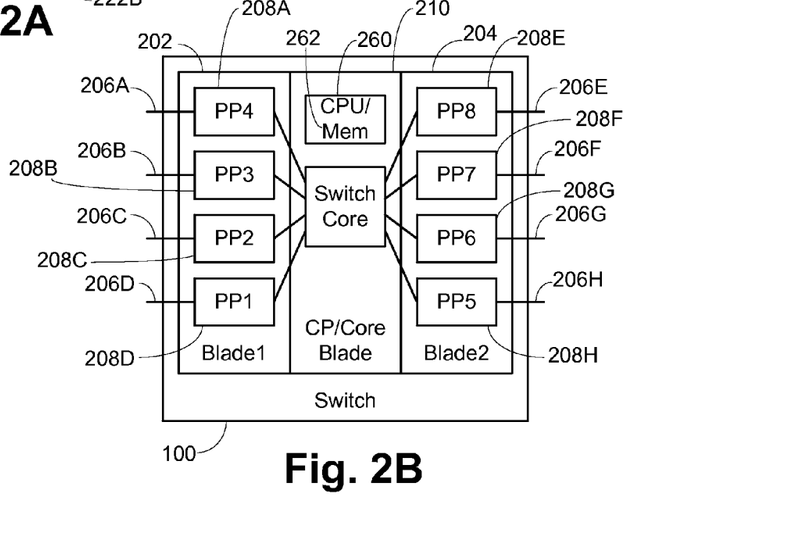
FIG. 2B is a block diagram of the large chassis Ethernet switch of FIG. 1A.

As seen, each switch, taking the chassis switch 100 as an example, includes a central processing unit (CPU) 260, and the memory 262 includes both random access memory (RAM) for general operations and non-volatile memory such as flash memory or a hard drive. The non-volatile memory stores an operating system to control the switch 100, drivers to control the packet processors 206 and switch manager and control software in interface with the administrator. The switch manager software can be a stack manager for a stack, a simpler switch manager for other simple configurations or a cluster manager for a complex configuration.

Figure 5:
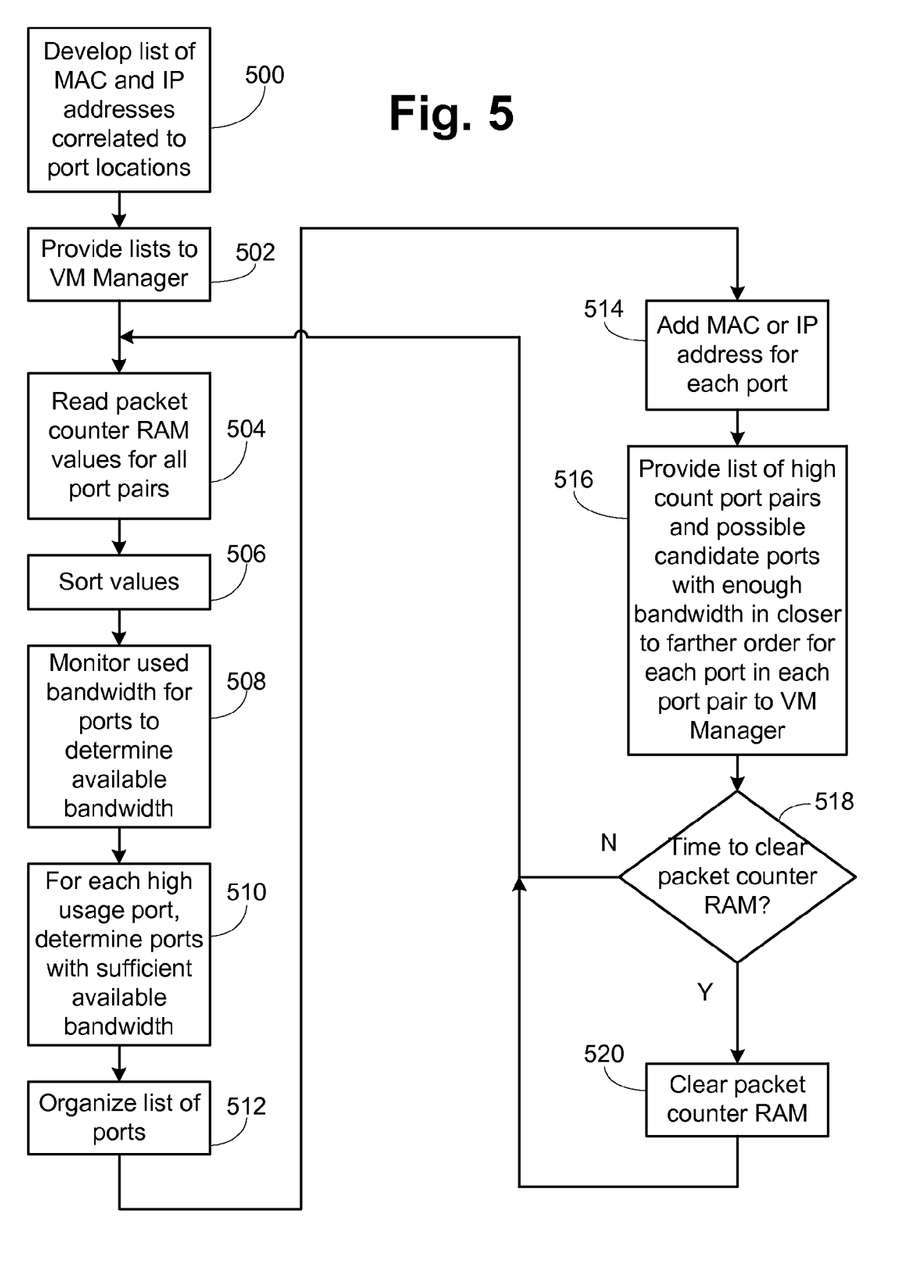
FIG. 5 is a flowchart of virtual machine management operations in an Ethernet switch according to the present invention.

FIG. 5 is a flowchart of the operations of the stack manager, or other switch manager software for the relevant switch configuration. Initially at step 500 the stack manager software determines the MAC and IP addresses correlated to the various switch ports. This list is provided to the VM manager 108 in step 502. Periodically at step 504 the stack manager software reads the packet counter table memory 400 to obtain all of the count and total length values for each port pair, a port pair being the two ports between which various data flows are occurring. In step 506 the values are then sorted to find the highest usage port pairs. In step 508 the stack manager software then also monitors the used bandwidth of each port to determine available bandwidth at each port. Then, in step 510 for each port in each high usage port pair, the stack manager software determines other ports with enough available bandwidth to receive the flows for that port pair and that are closer than the existing port of the other VM. In step 512 the resulting list of ports is then preferably organized in order from closest port to farthest port, close and far being based on either hop count, actual distance or some combination of hops and distance. The switch manager software knows the physical arrangement and interconnections of the switch ports and can then do this ordering. This sorted list of ports are then the available ports that could receive the VM associated with that end of the particular port pair in general order of desirability from a network perspective. To allow the VM manager 108 to associate the port with the attached server hardware, in step 514 a list of at least one MAC or IP address associated with that port is prepared, so that the final list is a MAC or IP address list in order of closest port to farthest port. When this closest to farthest list is done for each port of each port pair in the high usage list, the combined list of high usage port pairs and their associated closest to farthest MAC or IP address lists is provided to the VM manager 108 in step 516. At a given interval as determined in step 518 the stack manager clears the counter table in step 520 to allow a new cycle to begin.

Figure 6A:
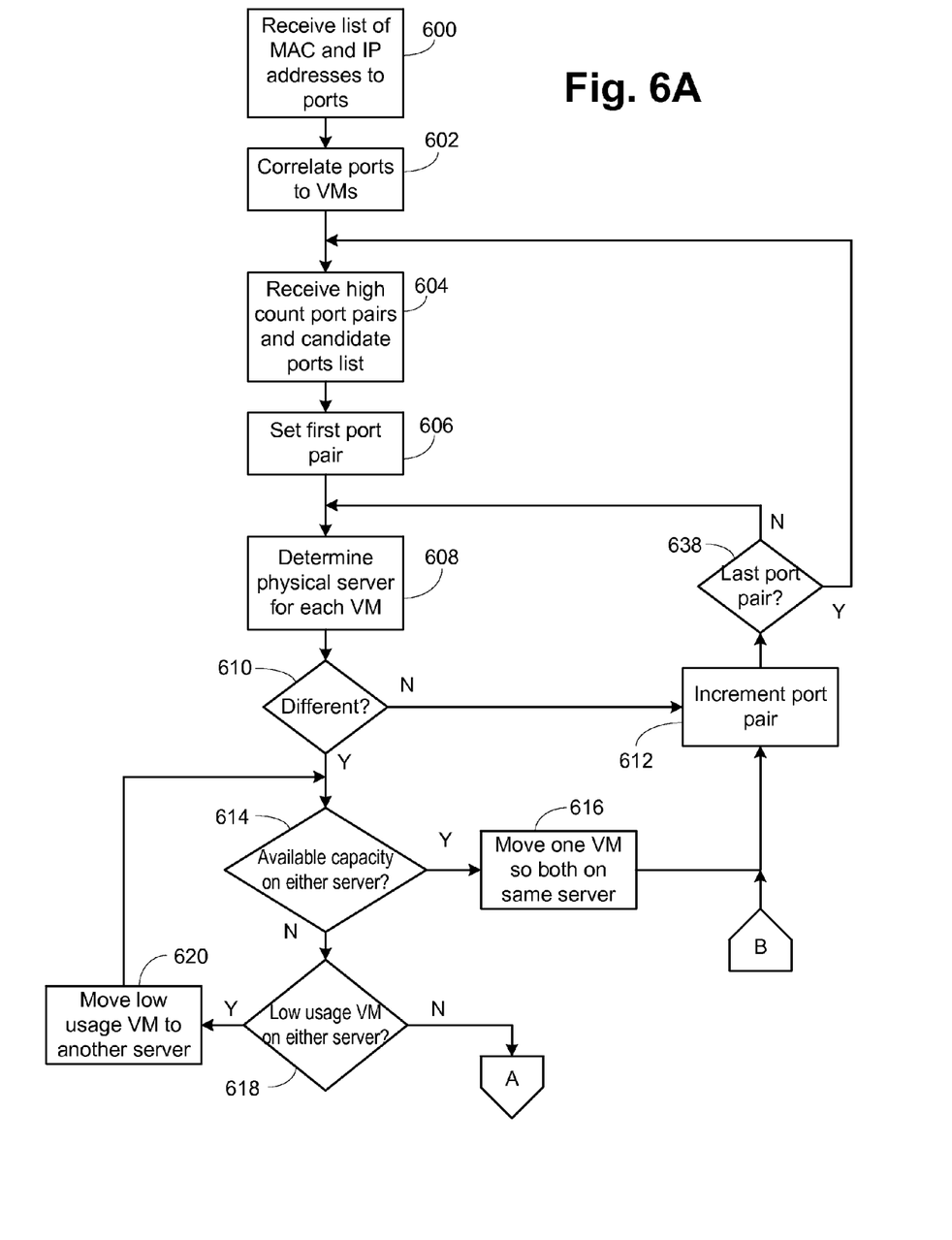
FIGS. 6A and 6B are a flowchart of a virtual machine manager according to the present invention.
Figure 6B:
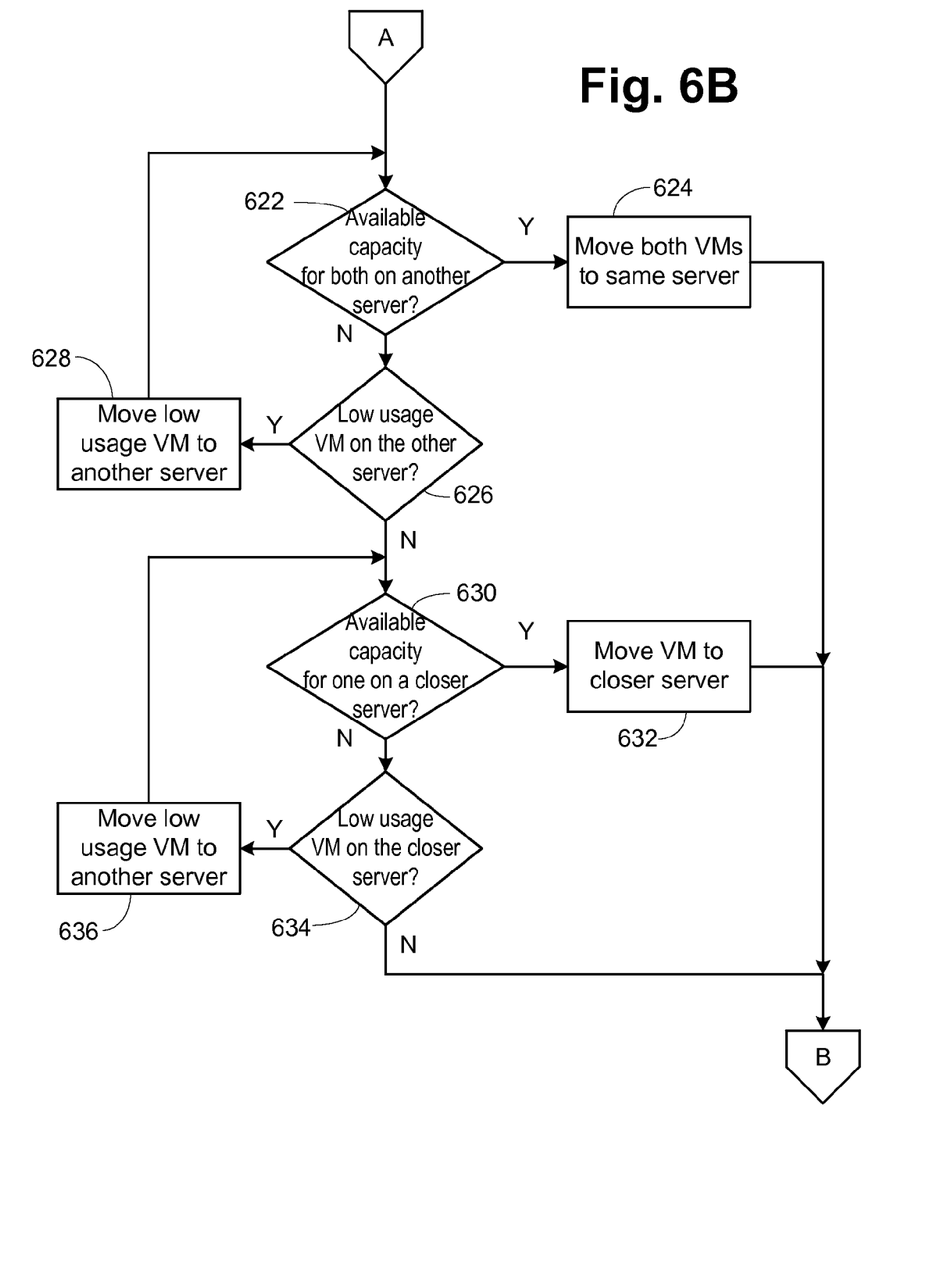

Referring to FIGS. 6A and 6B, the operations of the VM manager 108 are shown. Initially the VM manager 108 receives the MAC and IP address to port correlation list from the stack manager in step 600. From this list the VM manager 108 correlates the VMs to the ports in step 602. This can be done because the VM manager 108 knows the MAC and/or IP addresses used by each VM. This also allows the VM manager 108 to correlate physical server hardware to a port, or ports if multiple NICs are used. Then in step 604 the VM manager 108 gets the high usage port pair list from the stack manager. The VM manager 108 can then traverse the high usage port pair list from the highest usage to the lowest provided usage. Starting at the first port pair in step 606, the VM manager 108 determines the related VMs. Then the VM manager 108 determines the physical server for each VM in the port pair in step 608. If the VMs are on the same server as determined in step 610, as might be true if multiple network interface cards (NICs) are present, then the VMs cannot be moved to reduce network traffic and the operation proceeds with the next port pair in step 612. If the physical servers are different, the VM manager 108 determines in step 614 if either physical server has capacity for the other VM. If so, then in step 616 the other VM is migrated to that server to minimize network traffic, as the traffic will occur internally inside the physical server. If there is not enough capacity on the server, in step 618 the VM manager 108 determines if there is a low usage VM on one of the servers that could be migrated and free up enough capacity for the two high usage VMs to be placed together. If so, then in step 620 the low usage VM is migrated to another server and the capacity check is repeated.

If there is no low usage VM available, then in step 622 the VM manager 108 determines if there is another server that has sufficient capacity for both VMs of the port pair. If so, then in step 624 both VMs are migrated to that server. If not, then in step 626 the low usage check is done and the low usage VM is moved in step 628 if available. If the low usage VM option is not available in step 626, then the VM manager 108 parses the provided closest to farthest list for each port, correlating the indicated VMs to their respective servers and then performs a capacity check on that server in step 630. If there is available capacity at a closer server, the VM manager 108 migrates the VM from its current location to the closer location in step 632. As the close to far list only includes closer ports, the VM cannot be moved farther away if there is a usable entry in the list. If the entire close to far list is traversed and no acceptable candidate is found, the operation can be redone looking for low usage VMs that can be migrated in step 634. If one is found, the low usage VM is migrated in step 636 and then the high usage VM is migrated to the just freed up server. If no low usage VMs are found, then the VMs of that port pair cannot be moved and the next port pair is set in step 612. This continues until all of the port pairs in the high usage list have been reviewed as determined in step 638.

In this manner the stack manager software and the VM manager 108 each use information in their possession to improve network traffic due to high usage VMs.

The above scenario works well for switch stacks and virtual chassis switch clusters as a single stack or cluster manager is aware of the configuration and usage of each port in the stack or cluster. For the more general core-edge configuration, there is no directly equivalent stack manager. Instead a network-level manager can perform the stack manager operations as it is aware of or can determine the information known and used by the stack manager. The network manager can then interact with the VM manager to improve network operations.

In the preferred embodiment hardware counters are provided for each port in the packet processor. In an alternate embodiment conventional statistics analyzers such as sflow on demand can be used to construct the port pair usage table on stack-master for those top talking ports. The flow table identifies the IP addresses and L4 ports of the heavy communicating applications in a manner similar to that done by the counting hardware.

Figure 7:
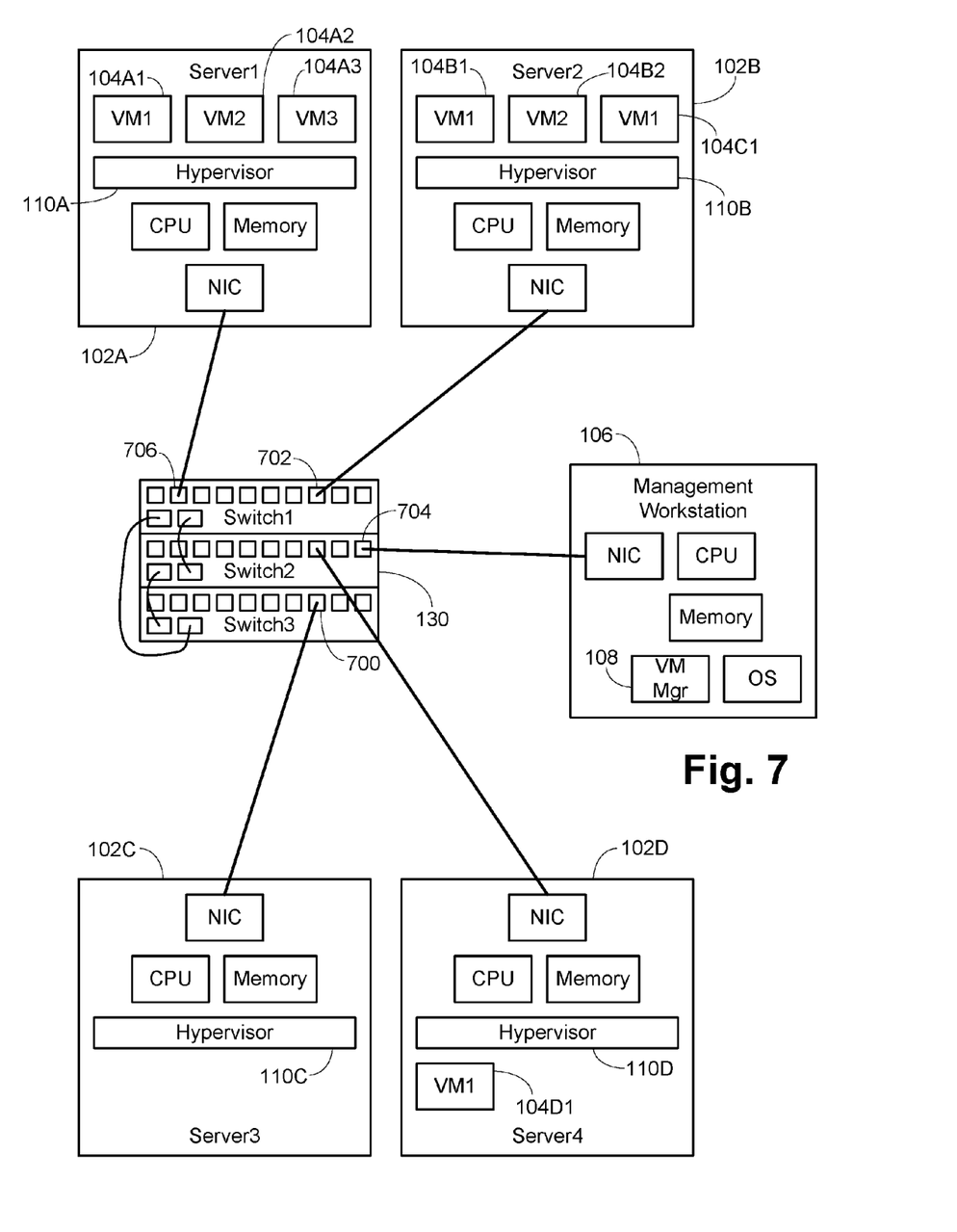
FIG. 7 is the block diagram of FIG. 1B with a VM moved.

FIG. 7 in conjunction with FIG. 1B provide an example of the movement of a VM. Referring to FIG. 1B, the VM1 104C1 is located in server3 102C. In this example, it is determined that VM1 104C1 must be moved, as server3, 102C is being shut down for maintenance purposes. Also assume that VM1 104C1 is communicating with VM2 104A2 in servers 102A. The stack manger software will have provided the VM manager 108 with the list of alternate ports for the port pair for VM1 104C1 and VM2 104A2, ports 700 and 706. In the simple example of FIG. 1B, there are two possible alternate ports, port 702 used by server2 102B and port 704 used by server4 102D. The stack manager software will have ordered the list so that port 702 is closer than port 704 for port 706 and port 704 is closer than port 702 for port 700. As port 700 is being removed, the VM manager 108 references the list for port 706 and selects port 702 as the initial candidate. In this example server2 104B has capacity to receive VM1 104C1 and port 702 also has sufficient available bandwidth. Therefore the VM manager 108 moves the VM1 104C1 to server2 102B as shown in FIG. 7.

In another alternate embodiment, instead of providing a list of MAC or IP addresses in closest to farthest order, the stack manager can provide the VM manager 108 with a list of available ports with hop counts or other performance data related to the given port. As the VM manager 108 has already correlated VMs to ports, this correlation can be used with the port information to find a server with capacity that is closer.

Using the architecture described provides more control than current VM protocols such as VXLAN, which is designed to maintain VM connectivity while it is being moved, but the moving decision is solely a VM manager 108 decision based on the servers load without considering the underlying network topology. The same concepts can be applied to a virtual chassis cluster/trunk to minimize interchassis traffic.

The basic operations are also useful in the case of bare-metal servers connected to a router-switch stack by providing port-to-port statistics and a device hop count between hosts connected to different stack members. The operations provide enough data to control traffic engineering without the need to maintain IP flow statistics within each router-switch, which requires large size hardware tables and hence the price of such a device will be significantly higher.

It also serves as an easy and low cost hardware statistics analysis tool within a stack without overhead on the control plane central processor unit (CPU) to pinpoint top talking physical port pairs within the stack. That allows enabling more granular tools such as sflow on demand and only on a few ports, which reduces the resources needed by sflow.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network comprising:
    a virtual machine (VM) manager for managing the operations of a plurality of VMs on a plurality of physical servers, at least some VMs communicating with at least some VMs on different servers;
    a network switch arrangement having a plurality of ports for interconnecting the plurality of physical servers which measures packet flow for each port and for each ingress and egress port pair where VMs on different physical servers are communicating; and a switch manager cooperating with the network switch arrangement and coupled to said VM manager, wherein said switch manager maps packet addresses to ports of said network switch arrangement, provides such mapping to said VM manager, receives values indicating used bandwidth between a plurality of port pairs, determines available bandwidth for ports of said network switch arrangement interconnecting the plurality of physical servers, determines ports having available bandwidth greater than the used bandwidth for at least a portion of said plurality of port pairs, for each of the ports in said at least a portion of said plurality of port pairs organizes a list of ports having available bandwidth greater than the used bandwidth for the port pair that are closer to a port in the port pair than the other port in the port pair in a closer to farther order, such that said organized list only includes ports having available bandwidth greater than the used bandwidth for a given port pair, for each port in each port pair of said at least a portion of said plurality of port pairs, and provides the organized list with closer port information to said VM manager, and wherein said VM manager receives said mapping of packet addresses to ports, maps ports to VMs of the plurality of VMs using said mapping of packet address to ports, receives said organized list with closer port information, determines current physical servers for VMs of the plurality of VMs, determines that a first VM communicating with a second VM on a different physical server and desired to be moved cannot be moved to be on the same server as the second VM, selects a different server for the first VM based on said organized list with closer port information and moves the first VM to the selected different server so that the first VM is closer to the second VM after being moved.

2. The network of claim 1, wherein the packet addresses are media access control (MAC) or Internet Protocol (IP) addresses.

3. The network of claim 1, wherein said switch manager includes the media access control (MAC) or Internet Protocol (IP) address associated with each port in said organized list of closer port information.

4. The network of claim 1, wherein said VM manager determining that a first VM cannot be moved includes determining that both the first and second VMs cannot fit on either physical server of the first VM and the second VM.

5. The network of claim 1, wherein said VM manager determining that a first VM cannot be moved includes determining that a physical server that can fit both the first VM and the second VM is not available.

6. A network switch arrangement comprising:

a plurality of ports for interconnecting a plurality of physical servers, the plurality of physical servers including a plurality of virtual machines (VMs), at least some VMs communicating with at least some VMs on different servers, which measure packet flow for each port and for each ingress and egress port pair where VMs on different servers are communicating; and a switch manager coupled to said plurality of ports for communicating with a VM manager, wherein said switch manager maps packet addresses to ports of said network switch arrangement, provides such mapping to said VM manager, receives values indicating used bandwidth between a plurality of port pairs, determines available bandwidth for ports of said switch arrangement interconnecting the plurality of physical servers, determines ports having available bandwidth greater than the used bandwidth for at least a portion of said plurality of port pairs, for each of the ports in said at least a portion of said plurality of port pairs organizes a list of ports having available bandwidth greater than the used bandwidth for the port pair that are closer to a port in the port pair than the other port in the port pair in a closer to farther order, such that said organized list only includes ports having available bandwidth greater than the used bandwidth for a given port pair, for each port in each port pair of said at least a portion of said plurality of port pairs, and provides the organized list with closer port information to said VM manager.

7. The network switch arrangement of claim 6, wherein the packet addresses are media access control (MAC) or Internet Protocol (IP) addresses.

8. The network switch arrangement of claim 6, wherein said switch manager includes the media access control (MAC) or Internet Protocol (IP) address associated with each port in said organized list of closer port information.

9. A computer comprising:

a processor;

a network interface for connecting to a network switch arrangement interconnecting a plurality of physical servers, the plurality of physical servers including a plurality of virtual machines (VMs), at least some VMs communicating with at least some VMs on different servers, the network switch arrangement having a plurality of ports for connection to the plurality of physical servers, where each port of the plurality of ports measures packet flow for each port and for each ingress and egress port pair where VMs on different servers are communicating, said network interface coupled to said processor;

memory for storing data and programs, said programs including a VM manager, wherein said VM manager receives a mapping of packet addresses to ports, maps ports to VMs of the plurality of VMs using said mapping of packet address to ports, receives an organized list with closer port information, said organized list including a list of ports having available bandwidth greater than the used bandwidth for the port pair that are closer to a port in the port pair than the other port in the port pair in a closer to farther order, such that said organized list only includes ports having available bandwidth greater than the used bandwidth for a given port pair, for each port in each port pair of said at least a portion of said plurality of port pairs, determines current physical servers for VMs of the plurality of VMs, determines that a first VM communicating with a second VM on a different physical server and desired to be moved cannot be moved to be on the same server as the second VM, selects a different server for the first VM based on said organized list with closer port information and moves the first VM to the selected different server so that the first VM is closer to the second VM after being moved.

10. The computer of claim 9, wherein the packet addresses are media access control (MAC) or Internet Protocol (IP) addresses.

11. The computer of claim 9, wherein said VM manager determining that a first VM cannot be moved includes determining that both the first and second VMs cannot fit on either physical server of the first VM and the second VM.

12. The network of claim 9, wherein said VM manager determining that a first VM cannot be moved includes determining that a physical server that can fit both the first VM and the second VM is not available.

13. A non-transitory computer readable storage medium or media having computer-executable instructions stored therein for an application which causes a processor to perform the following method, the method comprising:

operating a switch manager which:

maps packet addresses to ports of a network switch arrangement interconnecting a plurality of physical servers, the plurality of physical servers including a plurality of virtual machines (VMs), at least some VMs communicating with at least some VMs on different servers, the network switch arrangement having a plurality of ports for connection to the plurality of physical servers, where each port of the plurality of ports measures packet flow for each port and for each ingress and egress port pair where VMs on different servers are communicating;

provides such mapping to a VM manager;

receives values indicating used bandwidth between a plurality of port pairs;

determines available bandwidth for ports of said network switch arrangement interconnecting the plurality of physical servers;

determines ports having available bandwidth greater than the used bandwidth for at least a portion of said plurality of port pairs;

for each of the ports in said at least a portion of said plurality of port pairs organizes a list of ports having available bandwidth greater than the used bandwidth for the port pair that are closer to a port in the port pair than the other port in the port pair in a closer to farther order, such that said organized list only includes ports having available bandwidth greater than the used bandwidth for a given port pair, for each port in each port pair of said at least a portion of said plurality of port pairs; and provides the organized list with closer port information to the VM manager.

14. The non-transitory computer readable storage medium or media of claim 13, wherein the packet addresses are media access control (MAC) or Internet Protocol (IP) addresses.

15. The non-transitory computer readable storage medium or media of claim 13, wherein said switch manager includes the media access control (MAC) or Internet Protocol (IP) address associated with each port in said organized list of closer port information.

16. A non-transitory computer readable storage medium or media having computer-executable instructions stored therein for an application which causes a processor to perform the following method, the method comprising:

operating a virtual machine (VM) manager which receives a mapping of packet addresses to ports of a network switch arrangement interconnecting a plurality of physical servers, the plurality of physical servers including a plurality of VMs, at least some VMs communicating with at least some VMs on different servers, the switch arrangement having a plurality of ports for connection to the plurality of physical servers, where each port of the plurality of ports measures packet flow for each port and for each ingress and egress port pair where VMs on different servers are communicating;

maps ports to VMs of the plurality of VMs using said mapping of packet address to ports;

receives an organized list with closer port information, said organized list including a list of ports having available bandwidth greater than the used bandwidth for the port pair that are closer to a port in the port pair than the other port in the port pair in a closer to farther order, such that said organized list only includes ports having available bandwidth greater than the used bandwidth for a given port pair, for each port in each port pair of said at least a portion of said plurality of port pairs;

determines current physical servers for VMs of the plurality of VMs;

determines that a first VM communicating with a second VM on a different physical server and desired to be moved cannot be moved to be on the same server as the second VM;

selects a different server for the first VM based on said organized list with closer port information; and moves the first VM to the selected different server so that the first VM is closer to the second VM after being moved.

17. The non-transitory computer readable storage medium or media of claim 16, wherein the packet addresses are media access control (MAC) or Internet Protocol (IP) addresses.

18. The non-transitory computer readable storage medium or media of claim 16, wherein said VM manager determining that a first VM cannot be moved includes determining that both the first and second VMs cannot fit on either physical server of the first VM and the second VM.

19. The non-transitory computer readable storage medium or media of claim 16, wherein said VM manager determining that a first VM cannot be moved includes determining that a physical server that can fit both the first VM and the second VM is not available.

20. The non-transitory computer readable storage medium or media of claim 16, the method further comprising:

operating a switch manager which:

maps packet addresses to ports of the network switch arrangement;

provides such mapping to the VM manager;

receives values indicating used bandwidth between a plurality of port pairs;

determines available bandwidth for ports of said switch arrangement interconnecting the plurality of physical servers;

determines ports having available bandwidth greater than the used bandwidth for at least a portion of said plurality of port pairs;

for each of the ports in said at least a portion of said plurality of port pairs organizes a list of ports having available bandwidth greater than the used bandwidth for the port pair that are closer to a port in the port pair than the other port in the port pair in a closer to farther order; and provides the organized list with closer port information to the VM manager.

* * * * *